Aug. 22, 1961  J. HIRSCH  2,996,921
GYRO ROTOR CAGING DEVICE
Filed Aug. 31, 1955  2 Sheets-Sheet 1
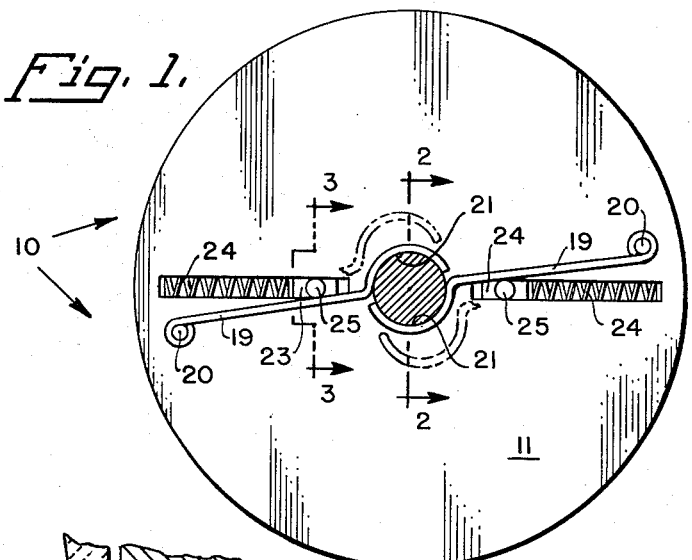
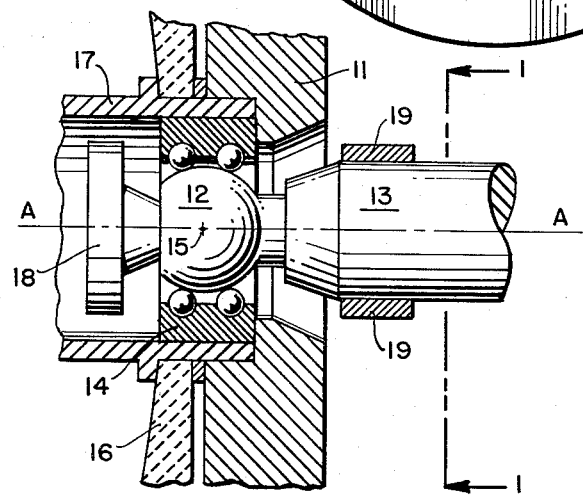
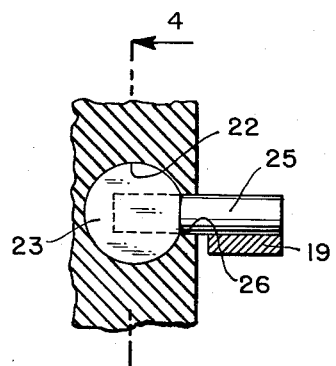
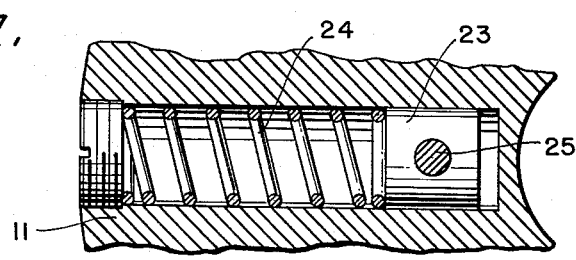
INVENTOR.
JOSEPH HIRSCH
BY
ATTORNEYS Aug. 22, 1961 J. HIRSCH 2,996,921
GYRO ROTOR CAGING DEVICE
Filed Aug. 31, 1955 2 Sheets-Sheet 2

INVENTOR.
JOSEPH HIRSCH
BY
ATTORNEYS

United States Patent Office 2,996,921
Patented Aug. 22, 1961

2,996,921
GYRO ROTOR CAGING DEVICE
Joseph Hirsch, 965 Chattanooga, Pacific Palisades, Calif.
Filed Aug. 31, 1955, Ser. No. 531,850
4 Claims. (Cl. 74—5.1)
(Granted under Title 35, U.S. Code (1952), sec. 266)

The invention described herein may be manufactured and used by or for the Government of the United States of America for governmental purposes without the payment of any royalties thereon or therefor.

This invention relates to gyroscopic devices and more particularly to improvements in apparatus for caging a gyro rotor for rotation about a predetermined axis.

In certain guided missiles, particularly those which are rocket propelled and provided with optical target seeking apparatus for controlling the guidance surfaces of the missile to effect its homing on a target which radiates infra-red energy such as a jet aircraft or the like, it has been the practice to provide the seeking apparatus with caging means for its gyro rotor to restrain the latter from movement away from a position in which the axis of rotation of the rotor is coincident with the longitudinal axis of the missile. An example of such type of target seeking apparatus which is of the Cassegrainian telescope type is disclosed in U.S. patent application of Francis McCaffrey, Serial No. 472,267, filed November 30, 1954.

The application just referred to discloses, in general, a gyro rotor to which is affixed a primary reflecting mirror and a secondary mirror which reflect radiant energy to a scanner, the elements just mentioned all being bodily rotatable as a unit about an axis which may become disposed angularly to the missile axis after the rotor is uncaged and the missile is in flight toward a target. The energy passes through the scanner to a radiant energy responsive device which is fixed relative to the missile axis. The application referred to also discloses the use of unillustrated gyro caging mechanism and it is to such mechanism that this invention particularly relates. It need not, however, be employed only with the specific apparatus referred to, but may also be employed in other variations of similar target seeking apparatus as well as with other gyro rotors where applicable.

One of the objects of the invention is to provide improvements in caging apparatus for gyros employed with target seeking telescopes.

Another object is to provide caging apparatus which will maintain a rotor in predetermined position relative to a reference axis of a missile until the rotor is rotated at a desired speed.

Another object is to provide caging apparatus which will maintain a rotor in a predetermined position relative to a reference axis of a missile during transportation and handling of same while subjected to acceleration forces which would otherwise effect movement of the rotor away from the predetermined position and possibly cause damage to it and its associated delicate parts.

Another object is to provide caging mechanism which is extremely simple in construction, subject to economical fabrication and free of malfunction during operation.

Other objects, advantages and salient features will become more apparent from the description to follow, the appended claims and the accompanying drawing, in which:

FIG. 1 is a reduced rear elevation of the invention as viewed from plane 1—1, FIG. 2;

FIG. 2 is an enlarged section taken on line 2—2, FIG. 1;

FIG. 3 is an enlarged section taken on line 3—3, FIG. 1;

FIG. 4 is a section taken on line 4—4, FIG. 3;

Figure 5:
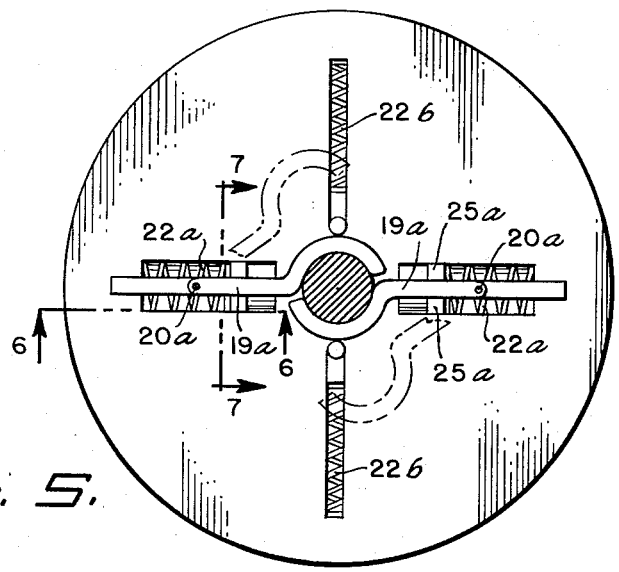
FIG. 5 is an elevation, like FIG. 1 of an alternative form of the invention.

Referring in detail to the drawing, and particularly FIGS. 1 to 4, target seeking apparatus 10 comprises a gyro rotor 11 mounted for rotation on ball 12 of shaft 13, the latter being fixed to a guided missile with axis A—A coincident or parallel to the longitudinal axis of same. A universal type ball bearing 14 supports the rotor so that it may rotate about various axes lying along the surface of various cones having their apexes at the geometrical center 15 of the ball. A primary mirror 16 is affixed to rotor 11 and a support 17 also affixed to the rotor, carries a secondary mirror (not shown). Radiant energy responsive device 18 is affixed to the forward end of shaft 13. The structure so far described forms no part of the invention, per se, this being conventional as disclosed in the identified copending application.

The subject of the invention, to now be described, comprises a pair of identical arms 19, 19, each pivotally connected to the rotor by a pivot pin 20, the inner ends of the arms each having an arcuate portion 21 adapted to engage the cylindrical surface of shaft 13. The rotor is provided with diametrically disposed cylindrical guideways 22 in each of which is disposed a weight 23 adapted to move radially outward under urge of centrifugal force and biased radially inwardly by spring 24. A pin 25 is affixed to each weight and projects through a guide slot 26, its outer end engaging one side of an arm. As will be apparent from FIG. 1, when the rotor is at rest the engagement of portion 21 with shaft 13 will effect restraint of the rotor to a position wherein its plane is perpendicular to axis A—A, this being the caged position. When the rotor is increased in speed the weights will overcome the resistance of their respective springs and move outwardly in their guideways. The centrifugal force acting on the arms will then effect disengagement of portions 21, 21 and thus permit the rotor to rotate about various axes disposed angularly to axis A—A. Suitable stops (not shown) may be provided on the rotor to limit outward swinging movement of the arms. The means for rotating the rotor may comprise turbine blades thereon which receive a pressure fluid or the rotor may be the armature or field of an electric motor, such rotating devices being well known in the art and hence not illustrated to simplify the disclosure.

Figure 6:
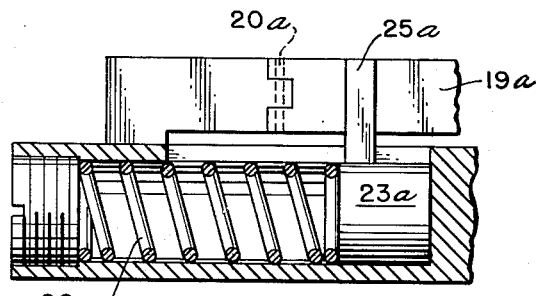
FIG. 6 is an enlarged section taken on line 6—6, FIG. 5.
Figure 7:
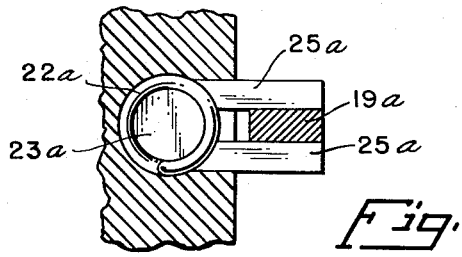
FIG. 7 is an enlarged section taken on line 7—7, FIG. 5.

The alternate form of invention illustrated in FIGS. 5 to 7 comprises arms 19a, 19a which are pivoted to the rotor by pivot pins 20a, 20a. The weights 23a are essentially the same as those previously described except that each is provided with a pair of pins 25a, 25a which straddle the opposite sides of the arms and slidably engage same. In this construction the arms are restrained from outward movement until these pins move outwardly beyond the pivots 20a. A pair of diametrically disposed guideways 22b, 22b, slideably carry spring urged weights like those illustrated in FIGS. 1, 3 and 4, the pins of which engage the arms at points substantially at right angles to guideways 22a, 22a. This structure cooperates with the arms and springs and weights 19a, 23a to ensure that the arms do not disengage from the shaft under lateral acceleration forces such as might be occasioned through rough handling or accidental dropping of the missile. It will be apparent that these auxiliary weights may be employed in the construction shown in FIGS. 1 to 4 or may be omitted from either of the alternate constructions, if so desired.

Obviously many modifications and variations of the present invention are possible in the light of the above

What is claimed is:

1. In target seeking apparatus for guided missiles of the type in which a gyro rotor is mounted upon a cylindrical supporting shaft by universal type bearing means for rotation and precessing movement relative to said shaft about said bearing means from a normal position in which the axis of rotation of said rotor is coincident with the direction of flight of the missile, the improvements, in combination, comprising; caging means for restraining said rotor from moving away from said normal position when the rotor is not rotating and while rotating below a predetermined angular speed, said means comprising at least two equi-angularly spaced arms each pivotally connected to the rotor, said arms each having a portion normally contacting the cylindrical surface of said shaft to constrain said rotor to said normal position, a weight for each arm carried by the rotor for movement relative to the rotor in response to centrifugal force, a spring for each weight biasing same in a direction opposite to the direction of said movement, and means carried by each weight and engaging its associated arm for restraining same to a normal position wherein its said portion engages said cylindrical surface, each arm adapted to move away from the position aforesaid in response to centrifugal force acting upon it when the rotor rotates above a predetermined angular speed.

2. Apparatus in accordance with claim 1 wherein said shaft is fixed relative to the missile.

3. Apparatus in accordance with claim 1 wherein said rotor carries a reflecting mirror adjacent the front side of same and said caging means is disposed adjacent the rear side of same.

4. Apparatus for constraining a gyro rotor to rotate about the axis on a non-rotatable shaft or the like on which it is universally mounted when rotating below a predetermined angular speed and for permitting the rotor to precess and rotate about other axes disposed angularly to the axis of the shaft when the rotor rotates above said predetermined speed, comprising; at least two equi-angularly spaced constraining members, each pivotally connected to the rotor and having a portion normally contacting the shaft to maintain the axis of rotation of the rotor and the axis of the shaft coincident, a weight for each constraining member slideably carried by a guideway on the rotor for outward movement in response to centrifugal force acting upon same, each weight being operatively connected to its associated constraining member to normally maintain it in its constraining position, and a spring for each weight adapted to urge it against said outward movement.

References Cited in the file of this patent

UNITED STATES PATENTS

| | | |
|---|---|---|
| 1,412,997 | Bonneau et al. | Apr. 18, 1922 |
| 1,988,463 | Schenk | Jan. 22, 1935 |
| 2,202,955 | Langgasser | June 4, 1940 |
| 2,295,503 | Miller | Sept. 8, 1942 |

FOREIGN PATENTS

| | | |
|---|---|---|
| 562,688 | Great Britain | July 12, 1944 |
| 861,605 | France | Nov. 4, 1940 |